United States Patent

Bucciero

Patent Number: 5,558,195
Date of Patent: Sep. 24, 1996

[54] SUBSTANTIALLY RECTANGULAR CROSS SECTION TRANSMISSION SPRING

[75] Inventor: Henry R. Bucciero, Harper Woods, Mich.

[73] Assignee: Kuhlman Corporation, Lexington, Ky.

[21] Appl. No.: 282,054

[22] Filed: Jul. 28, 1994

[51] Int. Cl.$^6$ ............................................. F16D 25/0638
[52] U.S. Cl. ..................... 192/85 AA; 192/70.28
[58] Field of Search ............................ 192/85 AA, 91 A, 192/89.27, 70.28, 85 A; 267/166, 179

[56] References Cited

U.S. PATENT DOCUMENTS

| Re. 14,287 | 4/1917 | Knudsen | 267/166 |
|---|---|---|---|
| 15,869 | 10/1856 | French | 267/166 |
| 251,739 | 1/1882 | Scott et al. | 267/166 |
| 2,068,062 | 1/1937 | Metten | 192/85 AA X |
| 2,104,962 | 1/1938 | Anderson. | |
| 2,108,059 | 2/1938 | Glasner | 192/85 AA X |
| 2,157,820 | 5/1939 | Fleck | 267/166 |
| 2,436,874 | 3/1948 | Spase. | |
| 2,639,014 | 5/1953 | Munschauer | 192/85 A |
| 3,489,255 | 1/1970 | Gatewood. | |
| 3,587,802 | 6/1971 | Pink. | |
| 3,782,708 | 1/1974 | Dulude et al.. | |
| 4,756,070 | 7/1988 | Takeuchi. | |
| 4,756,071 | 7/1988 | Takeuchi. | |
| 4,905,574 | 3/1990 | Trevisan. | |
| 4,958,753 | 9/1990 | Nogle et al. | 192/85 AA |
| 5,246,215 | 9/1993 | Takamura et al. | 267/179 X |
| 5,306,086 | 4/1994 | Orlowski et al.. | |

FOREIGN PATENT DOCUMENTS

| 1-193414 | 8/1989 | Japan. | |
|---|---|---|---|
| 4-165122 | 6/1992 | Japan | 192/85 AA |

*Primary Examiner*—Richard M. Lorence
*Attorney, Agent, or Firm*—Harness, Dickey & Pierce, P.L.C.

[57] ABSTRACT

A fluid actuated clutch assembly includes a coil spring which is manufactured from a substantially rectangular includes cross section wire. Both ends of the spring are manufactured with open and ground ends to ensure that the load from the spring is transferred in a smooth and uniform manner.

6 Claims, 2 Drawing Sheets

SUBSTANTIALLY RECTANGULAR CROSS SECTION TRANSMISSION SPRING

FIELD OF THE INVENTION

The present invention relates to transmission springs. More particularly, the present invention relates to transmission springs produced from a rectangular cross section wire for use in automatic transmissions for vehicles.

BACKGROUND OF THE INVENTION

Automatic transmissions for vehicles often include a plurality of spring assemblies that are adapted to apply, typically via a die-case piston member, a biasing force against various clutch and friction plate assemblies that control the engagement and disengagement of the various gears in the automatic transmission. A typical clutch assembly is comprised of a series of discs called clutch plates which have floating between them an additional series of plates called friction plates. Prior to the engagement of the plates by the piston, the clutch plates and the friction plates act as separate components, each moving independently with respect to the other component. As the clutch plates are compressed by the piston into engagement with the friction plates, there is enough force generated to cause the clutch plates and friction plates to adhere to each other. Once this "squeezing" occurs, the clutch plates and friction plates move as one, and so do their respective components. As the piston is moving to engage the clutch and friction plates, it is also compressing a spring assembly. The spring assembly biases the clutch and friction plate assemblies into their disengaged position. These prior art spring assemblies generally comprise an annular plate having a multiplicity of circumferentially spaced, parallel-oriented compression springs mounted thereto. Alternately, the spring assembly may include a second annular plate secured to the opposite free ends of the compression springs as well. Spring assemblies of the above-described type are disclosed in U.S. Pat. Nos. 3,782,708 and 5,306,086.

With the advent of automatic transmissions having four, five and even six forward gears, coupled with the need to package these transmissions into smaller overall volumes, there is a desire among the automobile manufacturers to reduce the size of the spring assemblies while at the same time increasing the axial force of the spring assemblies. The increase in the axial force is further required due to the increased amount of power being generated by today's engine and the requirement that the transmissions transmit this power to the remainder of the drive train of the automobile.

The prior art spring assemblies which consist of multiple round wire compression coil springs supported by one or possibly two annular retainers have experienced numerous constraints as the newer and smaller automatic transmissions are being designed and produced. Prior art spring assemblies do not make efficient enough use of the space available. Examples of non-utilized space include the center area of each individual coil spring and the areas around and between the individual coil springs. In some applications, in order to achieve the desired specifications, either the physical size or the required quantity of the individual coil springs renders the prior art spring assemblies ineffective. In order to extend the use of the prior art spring assemblies when space limitations are crucial, individual coil springs with a "space-filling" shape are combined with a minimum of inactive spring wire (i.e., using plain or partially closed ground ends). These shaped springs are then fabricated with a high tensile strength material in order to meet the required specifications.

In addition to the problems associated with meeting today's performance specification, the prior art spring assemblies all suffer from the problems associated with a complex multiple piece assembly and the reliability issues involved in its manufacture, installation and service.

A major concern in the clutch release spring industry is a phenomenon called shudder. There are many contributing factors which cause shudder, one of the larger known causes being the uneven pressures which are placed on the piston as the piston is being compressed. This uneven pressure causes the piston to tilt or cock within the clutch assembly and apply forces to one area of the clutch plates before the other. By applying uneven forces in this manner, true engagement of the clutch plates and friction plates does not occur and slippage of the assemblies is prevalent. Not only is slippage undesirable for the noise, vibration and harshness of the vehicle, it can also lead to early wear and possibly failure of the clutch assemblies.

The prior art spring assemblies have addressed these problems by incorporating the annular retainers to evenly absorb and distribute loads and by moving the multiple round wire compression springs radially outward as far as possible to retain a low, safe slenderness ratio of the spring assembly. (It's overall height compared to its overall mean diameter).

Accordingly, it is the primary objective of the present invention to provide a single piece spring which replaces the prior art spring assemblies while providing for an increase in the performance of the spring within the transmission assembly. In addition, it is also an object of the present invention to provide a single piece spring which satisfies the increasing performance specification in a reliable and cost-effective manner.

SUMMARY OF THE INVENTION

In general, the present invention accomplishes these objectives by providing a single piece substantially rectangular wire cross section compression spring which replaces the multiple component prior art spring assemblies. The single piece substantially rectangular wire cross section spring of the present invention allows for a significant increase in the performance characteristics of the spring within the transmission. In addition, the single piece substantially rectangular wire cross section spring has the advantage of a very low slenderness ratio and the transfer and distribution of uniform load. The transfer and distribution of the load for the single piece substantially rectangular wire cross section spring of the present invention is accomplished by means of its "dead" end coils. "Dead" end coils are coils that do not contribute to the storage or release of energy within the spring, but rather are the media in which the energy is transferred. The "dead" end coils of the present invention perform the same function as the annular retainers in the prior art spring assemblies but the "dead" end coils offer the advantage of being integral with the spring rather than being purchased as separate components.

The unique properties of the present invention are provided due to the use of substantially rectangular cross section wire. Conventional round wire compression springs do not maximize the use of the space which is available. The substantially rectangular cross sectional wire maximizes the use of the available space, offers lower maximum solid heights, lower stress values and more design flexibility when compared with the conventional round wire cross section springs.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
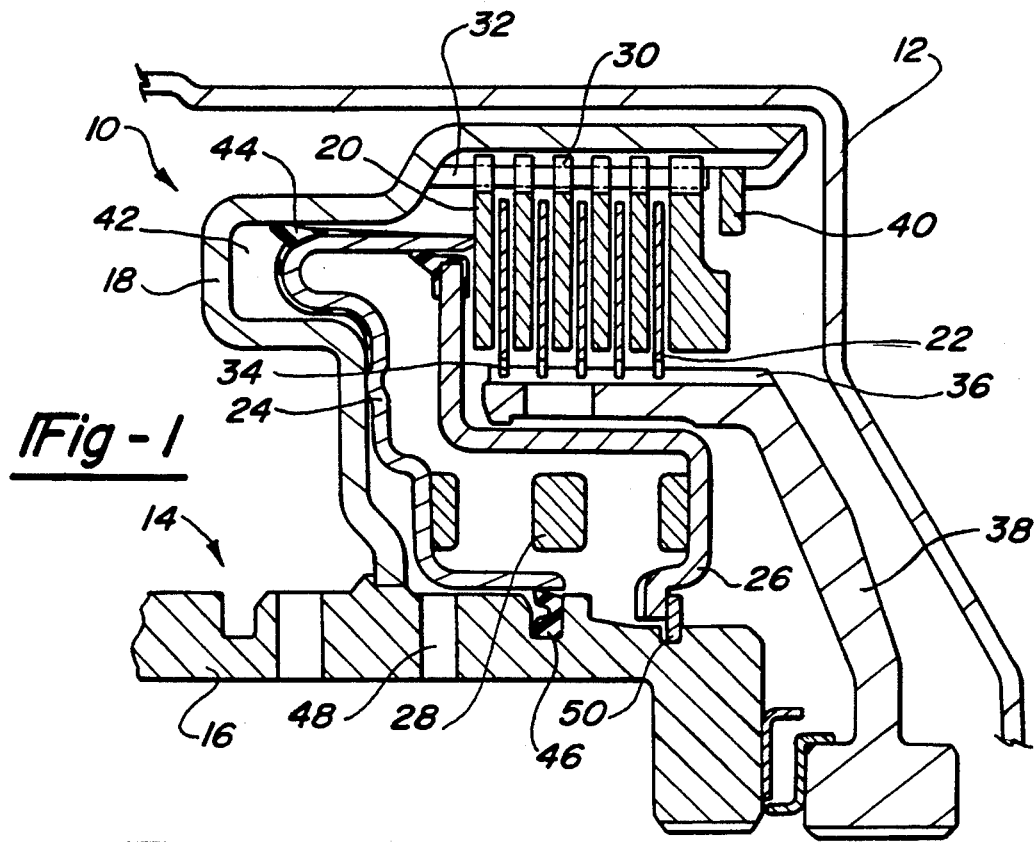
FIG. 1 is a partial cross sectional view of a typical clutch assembly in an automatic transmission with the clutch being in the released condition.

Referring now the drawings in which like reference numerals designate like or corresponding parts throughout the several views, there is shown in FIG. 1 a typical clutch assembly for an automatic transmission which is designated generically by the reference numeral 10. Clutch assembly 10 is shown encased within an automatic transmission 12 having an input member 14. Input member 14 comprises an annular input shaft 16 and a clutch outer housing 18 which is fixedly secured to input shaft 16.

Clutch assembly 10 comprises a plurality of clutch plates 20, a plurality of friction plates 22, an actuating piston 24, a backing plate 26 and a substantially rectangular cross section wire spring 28. Each of the plurality of clutch plates 20 include a spline 30 located on their exterior surface which cooperates with a spline 32 formed on the interior surface of clutch outer housing 18 such that rotation of clutch plates 20 with respect to housing 18 is prohibited but clutch plates 20 are allowed to move axially within housing 18. Interjected or interleaved between the plurality of clutch plates 20 are the plurality of friction plates 22 which include a spline 34 on their interior surface. Spline 34 cooperates with a spline 36 located on an output member 38 to locate the, plurality of friction plates 22 on output member 38 such that rotation with respect to member 38 is prohibited but friction plates 22 are allowed to move axially along member 38. A stop 40 which is fixedly secure to housing 18 limits the axial movement of both plates 20 and 22.

Piston 24 is located adjacent to the plurality of clutch plates 20 and the plurality of friction plates 22 such that plates 20 and 22 are disposed between piston 24 and stop 40. Piston 24 cooperates with housing 18 to form a fluid chamber 42 which is utilized for the operation of clutch assembly 10. A first seal 44 disposed between piston 24 and housing 18 in connection with a second seal 46 disposed between piston 24 and input member 14 isolate chamber 42 from the remainder of clutch assembly 10 except for a fluid passageway 48 extending through input member 14.

Backing plate 26 is located adjacent to piston 24 and is located axially within clutch assembly 10 by a stop ring 50 which is fixedly secure to input member 14. Disposed between backing plate 26 and piston 24 is substantially rectangular cross section wire spring 28. Spring 28 biases piston 24 away from backing plate 26 or to the left as shown in FIG. 1 to place clutch assembly 10 into a released condition. In the released position, as shown in FIG. 1, clutch plates 20 and thus input member 14 are free to rotate relative to friction plates 22 and thus output member 38 due to the lack of compressive force existing between plates 20 and 22 caused by the biasing of spring 28. Thus input member 14 does not transmit power to output member 38.

Figure 2:
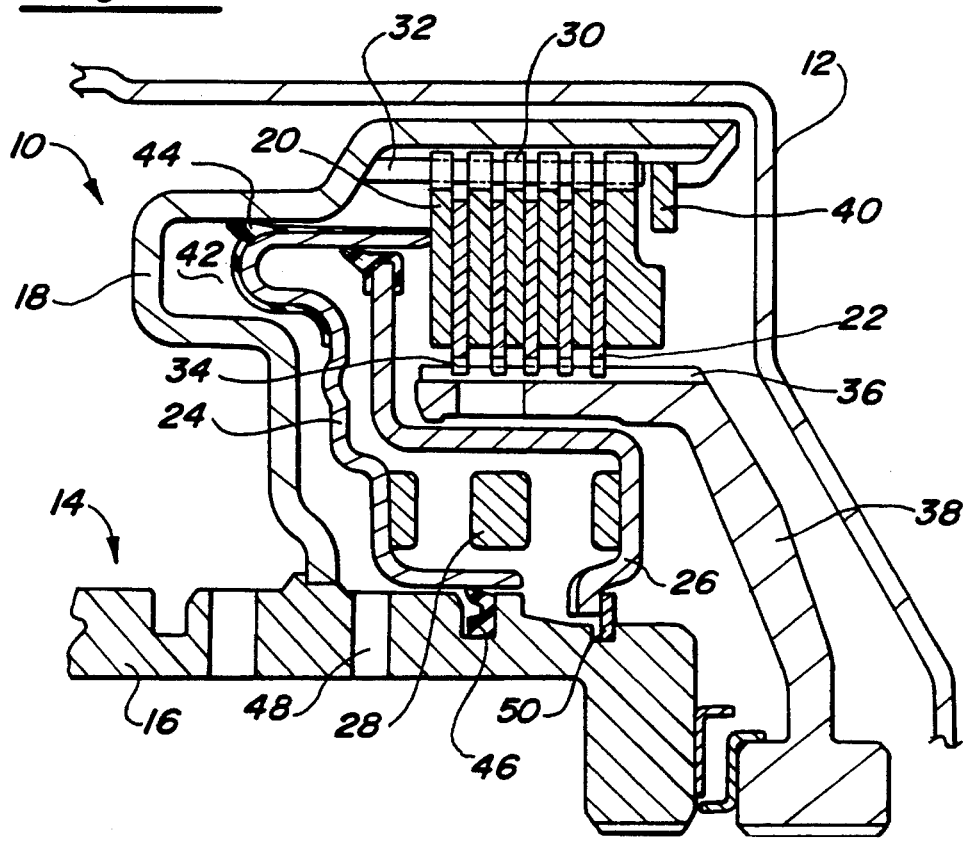
FIG. 2 is a partial cross sectional view similar to FIG. 1 but showing the clutch in the applied condition.

When clutch assembly 10 is to be applied, as shown in FIG. 2, pressurized fluid is supplied to chamber 42 causing piston 24 to move against the biasing load of spring 28 or to the right as shown in FIG. 2. The movement of piston 24 applies a clamping force on plates 20 and 22 between piston 24 and stop 40. As the clamping force is increased, friction drive between plates 20 and 22 begins until plates 20 and 22 are locked together and input member 14 transmits power or drives output member 38. When it is desired to release clutch assembly 10, fluid pressure is released from chamber 42 and piston 24 is again urged to the left as shown in FIG. 1 by the biasing load of spring 28.

Figure 3:
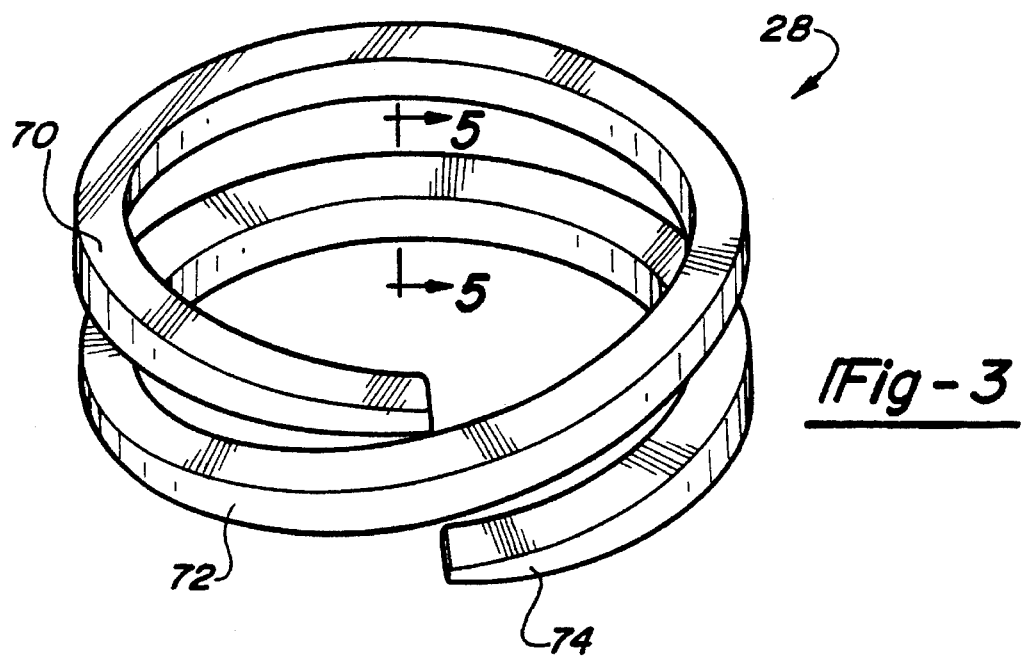
FIG. 3 is a perspective view of a substantially rectangular cross section wire spring according to the present invention.
Figure 4:
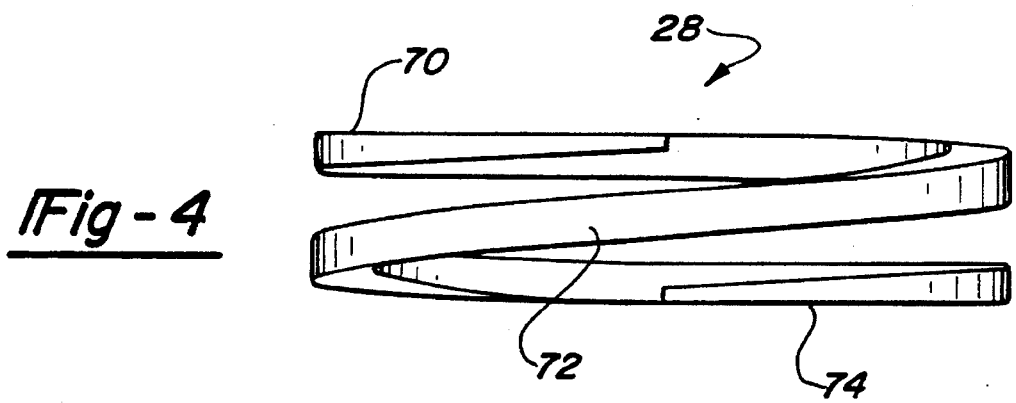
FIG. 4 is a side view of the spring shown in FIG. 3 showing the formation of the dead coils of the present invention; arid
Figure 5:
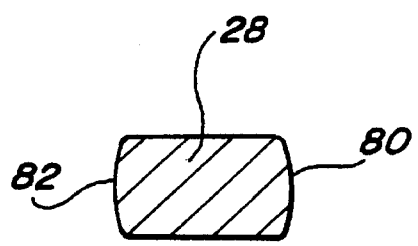
FIG. 5 is a cross sectional view of the substantially rectangular wire used to manufacture the spring shown in FIG. 3.

Substantially rectangular cross section wire spring 28 is shown in FIGS. 3 through 5 and is comprised of a first open and ground end 70, an active coil section 72 and a second open and ground end 74. Wire spring 28 is being referred to as a substantially rectangular cross section wire spring. It is to be understood that this terminology also includes a substantially square wire cross section wire spring due to the fact that a square is defined a rectangle with equal sides. In addition, as shown in FIG. 5, opposite sides 80 and 82 of wire spring 28 may be slightly rounded or curved due to the forming operation used to produce wire spring 28 but this cross section would still fall within the scope of the term substantially rectangular. Each open and ground end 70 and 74 defines a "dead" zone or what is termed an inactive coil or coils. Close attention must be given as to how these "dead" partially or fully closed end ground ends are formed. The squareness of each end 70 and 74 with respect to the longitudinal axis of spring 28 is paramount in controlling the parallel compression and extension of spring 28. Incorporation of "dead" ends 70 and 74 which are formed as part of substantially rectangular cross section wire spring 28 eliminates the need to purchase, as separate components, the equivalent of the annular retainers of the prior art. Eliminating components while maintaining and improving the performance of the product makes spring 28 of the present invention a distinct advantage over the known prior art spring and spring assemblies. As shown in FIGS. 3 and 4, upon full compression of spring 28, the solid height of the spring will be substantially less than the diameter of the spring.

Thus, the substantially rectangular cross section wire spring 28 of the present invention is unique to clutch assembly 10 due to its ability to efficiently utilize space, its ability to reduce the number of components, its uniform load distribution, its stability, its reduction in stresses as well as other advantages offered by spring 28.

While the above detailed description describes the preferred embodiment of the present invention, it should be understood that the present invention is susceptible to modification, variation and alteration without deviating from the scope and fair meaning of the subjoined claims.

What is claimed is:

1. A fluid actuated clutch assembly selectively movable between an applied condition and a released condition, said clutch assembly comprising:

an input member rotatably supported by said clutch assembly;

an output member rotatably supported by said clutch assembly;

a selectively operable clutch device for locking said input device to said output device;

a piston device slidably disposed within said clutch assembly, said piston device operable to move said clutch assembly between said applied condition and said released condition;

a pressure chamber defined by said clutch assembly for moving said piston device into one of said applied and released conditions;

an annular spring cavity defined by said clutch assembly adjacent to said pressure chamber and separated from said pressure chamber by said piston device; and a coil spring defining an outside diameter and being disposed within said annular spring cavity radially inward of said clutch device for urging said piston device into the other of said applied and said released conditions, said coil spring having a solid height substantially less than said outside diameter and comprising a substantially rectangular cross section wire such that said coil spring utilizes substantially the entire volume of said spring cavity.

2. The fluid actuated clutch assembly according to claim 1 wherein said coil spring urges said piston device into said released condition.

3. The fluid actuated clutch assembly according to claim 1 wherein said coil spring includes an open and ground end.

4. The fluid actuated clutch assembly according to claim 1 wherein said coil spring includes two open and ground ends.

5. The fluid actuated clutch assembly according to claim 1 wherein, said clutch comprises a plurality of interleaved friction discs, alternately splined, respectively, to said input device and said output device.

6. The fluid actuated clutch assembly according to claim 5 wherein, said coil spring is disposed coaxial with respect to said plurality of friction discs.

* * * * *